(12) United States Patent
Pan et al.

(10) Patent No.: US 7,918,179 B2
(45) Date of Patent: Apr. 5, 2011

(54) METHOD FOR APPARATUS FOR A DROP INDICATOR

(75) Inventors: Sheau-Shi Pan, Hsinchu (TW); Chi-Sheng Chang, Taoyuan County (TW); Feng-Yu Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 93 days.

(21) Appl. No.: 12/153,299

(22) Filed: May 16, 2008

(65) Prior Publication Data

US 2009/0145245 A1 Jun. 11, 2009

(30) Foreign Application Priority Data

Dec. 28, 2007 (TW) .............................. 96150733 A

(51) Int. Cl.
*G01L 5/00* (2006.01)
*G01D 11/00* (2006.01)
(52) U.S. Cl. ......... 116/203; 116/204; 116/205; 116/200
(58) Field of Classification Search .................. 116/200, 116/202, 203, 204, 211, 212, 267, 276; 73/12.01–12.05
See application file for complete search history.

(56) References Cited

U.S. PATENT DOCUMENTS

| | | | | |
|---|---|---|---|---|
| 3,413,951 A | * | 12/1968 | Schorn et al. | 116/267 |
| 3,623,449 A | * | 11/1971 | Knutson | 116/203 |
| 3,688,734 A | * | 9/1972 | George et al. | 116/215 |
| 3,707,722 A | * | 12/1972 | Itoh | 116/203 |
| 3,835,809 A | * | 9/1974 | Sinn, Jr. | 116/203 |
| 4,068,613 A | * | 1/1978 | Rubey | 116/203 |
| 4,125,085 A | * | 11/1978 | Rubey | 116/203 |
| 4,177,751 A | * | 12/1979 | Rubey | 116/201 |
| 4,470,302 A | * | 9/1984 | Carte | 116/203 |
| 5,242,830 A | * | 9/1993 | Argy et al. | 116/200 |
| 5,575,479 A | | 11/1996 | Ayres | |
| 5,970,794 A | | 10/1999 | Yoshida | |
| 5,983,724 A | | 11/1999 | Yoshida | |

(Continued)

FOREIGN PATENT DOCUMENTS

TW 1255342 5/2006

OTHER PUBLICATIONS

"Biocompatible Materials". US Industry Study with Forecasts to 2010 & 2015. Sep. 2006. <http://www.freedoniagroup.com/pdf/2111smwe.pdf>.*

*Primary Examiner* — Lisa M Caputo
*Assistant Examiner* — Jonathan Dunlap
(74) *Attorney, Agent, or Firm* — Bacon & Thomas, PLLC

(57) ABSTRACT

The present invention relates to an apparatus and method for a drop indicator having a magnet installed therein. The drop indicator according to the invention is used to determine whether a product has ever been dropped or impacted, either in delivery or in use, by inspecting changes in the original condition of the magnet caused by the interaction between the magnetic force and the acceleration of gravity, inertia force, and colliding force, etc. generated upon collision. Take a cell phone or a PDA, for example, changes in the indicative material of the drop indicator will help decide whether the faulty product has ever been dropped or impacted in delivery or in use, so that liability can be determined.

22 Claims, 10 Drawing Sheets

U.S. PATENT DOCUMENTS

| | | | |
|---|---|---|---|
| 6,066,088 A * | 5/2000 | Davis | 600/29 |
| 6,394,022 B1 * | 5/2002 | Johnston et al. | 116/206 |
| 6,553,930 B1 * | 4/2003 | Johnston et al. | 116/212 |
| 6,712,274 B2 * | 3/2004 | Dvorkis et al. | 116/203 |
| 6,848,389 B1 * | 2/2005 | Elsasser et al. | 116/203 |
| 7,219,619 B2 * | 5/2007 | Fitzer et al. | 116/203 |
| 7,469,595 B2 * | 12/2008 | Kessler et al. | 73/802 |
| 7,509,835 B2 * | 3/2009 | Beck | 73/12.01 |
| 2005/0217558 A1 * | 10/2005 | Fitzer et al. | 116/203 |
| 2007/0089480 A1 * | 4/2007 | Beck | 73/12.01 |
| 2007/0245810 A1 * | 10/2007 | Carter et al. | 73/53.01 |

* cited by examiner

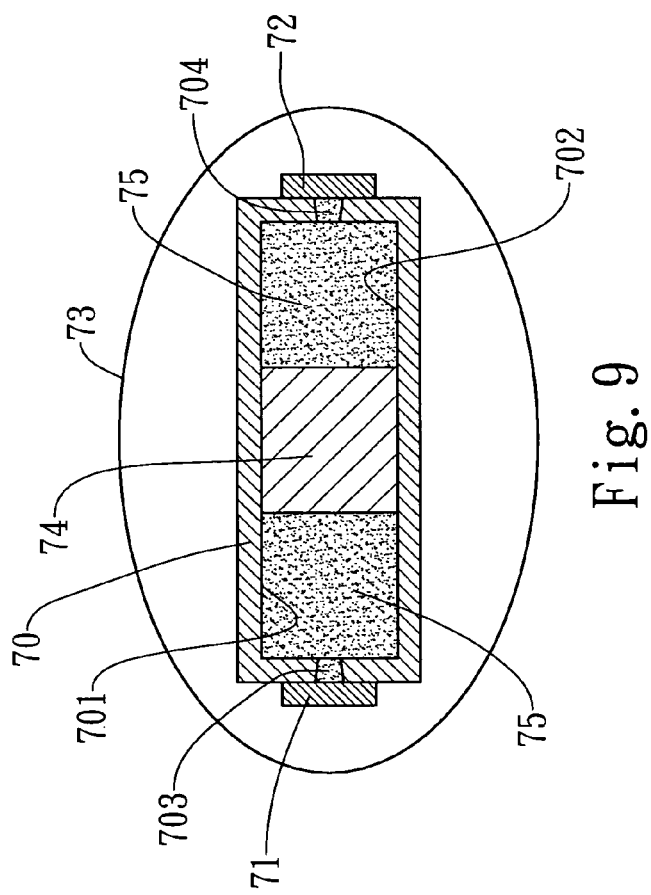
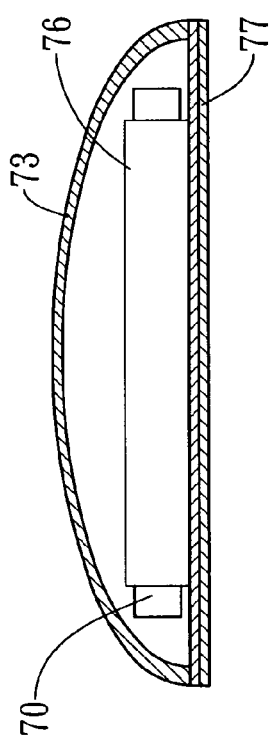
Fig. 9
Fig. 10

METHOD FOR APPARATUS FOR A DROP INDICATOR

BACKGROUND OF THE INVENTION

The present invention relates to an apparatus and method for a drop indicator, especially a drop indicator capable of telling whether a product has ever been impacted, either in delivery or in use, by showing changes in the indicative material of the drop indicator.

In response to the market demand for compact, highly capable, and impressive-looking electronic products, product designers have made impact-related-damage prevention one of the necessary things to be considered when planning the design. The emphasis on impact-related-damage prevention has also become one of the most important gain items in the mechanical design of the products. To highlight the emphasis, the product designs are largely verified by simulated calculations and experimental results, through which repeated modifications of the mechanical design are made or additional shockproof materials are added in order to satisfy the desired specifications. Nonetheless, whenever the product is dropped accidentally or intentionally in delivery or under warranty, causing defects in the product without external damage or proof of damage, it is always the proprietor of business that is made liable for the defects and the subsequent warranty costs, which are never attributable to the consumer or whoever who really causes the accident.

Take cell phones or PDAs, for example. Usually, it is very difficult to work out whether a product has ever been dropped or impacted during the period starting from the goods being packaged and delivered from the manufacturer to the end users to the discovery of defects in the product by end users upon opening the package. To overcome the problem, various techniques have been developed to help identify whether such products as cell phones or PDAs have been dropped or impacted. Sensors, for instance, are usually used to serve the above purpose, comprising capacitive sensors, cantilever reed sensors, coiled electromagnetic sensors, accelerator/inertial sensors, magnetic/magnetrorestrictive sensors, spring mass sensors, piezoelectric sensors, and liquid pressure sensors, etc.

In U.S. Pat. No. 5,970,794, coils are used to generate magnetic fields, which vary upon shock impact. As a result, current signals are sent out to indicate that an impact has occurred.

In U.S. Pat. No. 5,983,724, a rotatable magnetic bar or its equivalents are disposed between the magnets. The rotatable body will revolve when dropped or impacted, which will cause changes in the magnetic fields. As a result, current signals are sent out to indicate that an impact has occurred.

U.S. Pat. No. 5,575,479 describes a target whose lid will open up when shot in the air, allowing colored powders to be released to indicate that the target has been shot.

Besides, in Taiwanese patent No. I255342, a reed mechanism is installed in the corner of the cell phone. The string plate device comprises two spring plates, one of which will be disengaged when impacted or dropped, resulting in the break of circuit indicating that a shock or impact has occurred.

Finally, Shock Watch Company has made a shock indicator designated with model number MAG2000. The shock indicator is mostly attached to the outside of the package containing the delivered products or machines. The structure of the shock indicator includes a box divided into two chambers with a magnet fixed at the center of one chamber and a movable metal in the other chamber. The magnetic field is in perpendicular to the collision direction. Capitalizing on the fact that magnet attracts metal, the shock indicator allows the metal to move along the collision direction when dropped or impacted, so as to indicate whether the product has ever been dropped or impacted when in delivery.

SUMMARY OF THE INVENTION

The primary goal of the invention is to provide a drop indicator capable of telling whether a faulty product has ever been impacted or dropped, either in delivery or in use, by showing changes in the indicative material of the drop indicator.

The secondary goal of the invention is to allow examination of the condition of the consumptive electronic products. The invention, by being installed in the consumptive electronic products, helps decide whether a product has ever been dropped when in use, so that liabilities can be attributed to the manufacturer or the consumer.

To achieve the goals, the first embodiment of the drop indicator comprises a housing, a chamber, and at least one first seal element. The chamber is disposed inside the housing and has at least one first opening. The first seal element is used to seal the first opening. In this embodiment, the number of the opening determines the number of the seal element. For example, this embodiment comprises a second opening and a second element. The second opening and the first opening are disposed at the opposite ends of the hollow portion of the chamber. The chamber is filled with an indicative material, and the first seal element keeps the indicative material en-sealed in the chamber. In the event that the drop indicator is impacted, the first seal element and the indicative material will be released from the chamber and scattered inside the housing, helping determine whether a product has ever been impacted or dropped when in delivery. The indicative material comprises fluorescent powders or a plurality of colored granules, whose brightness facilitates observation.

While the fluorescent powders are used as the indicative material and discharged or released from the chamber, scattered all over the interior of the housing, the powders will no longer go back to their original conditions in that they will be adhered to the housing. On the other hand, if other kinds of granules are used as the indicative material and released from the chamber, scattered all over the interior of the housing, the granules can be recycled in that they will not be adhered to the housing.

The magnetic arrangement between the chamber and the first, or the second, seal element is subject to the type of the embodiment provided, comprising: the chamber is a plastic material and both the first seal element and the second seal element are magnetic bodies; the chamber is a metallic material and both the first seal element and the second seal element are magnetic bodies; the chamber is a magnetic body and both the first seal element and the second seal element are metallic materials; or the chamber is a magnetic body and both the first seal element and the second seal element are magnetic bodies.

The second embodiment of the present invention differs from the first embodiment in that the second embodiment allows impact detection in four directions, whereas the first embodiment allows impact detection in two directions. Namely, the second embodiment comprises a chamber having a first chamber and a second chamber formed in perpendicular to each other, with an indicative material filling each of the chambers. A first seal element, a second seal element, a third seal element, and a fourth seal element are used, respectively, to seal the first and the second openings of the first chamber and the third and the fourth openings of the second chamber to keep the indicative materials en-sealed en-sealed in the chambers. When the drop indicator is impacted or dropped, the magnetic element and the indicative material will be released from the chamber and scattered inside the housing, so as to indicate whether a product has ever been impacted or dropped either in delivery or in use.

The second embodiment of the present invention allows impact detection in four directions. Therefore, the equivalent structure of the present invention allows impact detection in three, or more than four, directions.

The magnetic arrangement between the chamber and the first, the second, the third or the fourth seal element is subject to the type of the embodiment provided, comprising: the chamber is a plastic material, whereas the first seal element, the second seal element, the third seal element, and the fourth seal element are magnetic bodies; the chamber is a metallic material, whereas the first seal element, the second seal element, the third seal element, and the fourth seal element are magnetic bodies; the chamber is a magnetic body, whereas the first seal element, the second seal element, the third seal element, and the fourth seal element are metallic materials; or the chamber is a magnetic body, whereas the first seal element, the second seal element, the third seal element, and the fourth seal element are magnetic bodies.

The third embodiment of the drop indicator is circular in form, comprising a first element and a second element combining each other forming a third space containing a third element. The first element comprises a hollow first joint portion and a first outer end. The second element comprises a hollow second joint portion and a second outer end, allowing the first element to join the second element to form a third space allowing the third element to be held within the third space. The third element comprises a hollow portion filled with an indicative material. The indicative material comprises fluorescent powders or a plurality of granules that may be colored.

When the drop indicator is impacted or dropped, the indicative material inside the third element will be released into the first element or the third element, allowing the observer to examine whether the product has ever been impacted or dropped.

The magnetic arrangement between the third element and the fifth, or the sixth, seal element is subject to the type of the embodiment provided, comprising: the third element is a plastic body and both the fifth seal element and the sixth seal element are magnetic bodies; the third element is a metallic material and both the fifth seal element and the sixth seal element are magnetic bodies; the third element is a magnetic body and both the fifth seal element and the sixth seal element are metallic materials; or the third element is a magnetic body and both the fifth seal element and the sixth seal element are magnetic bodies.

The fourth embodiment of the drop indicator comprises a chamber, a seventh seal element, and a third transparent element. The interior wall of the hollow chamber is provided with an annular portion. The annular portion in one type of the embodiment comprises a first end allowing the seventh seal element to seal it. The annular portion in another type of the embodiment comprises a first end and a second end, allowing the seventh seal element and the eighth seal element to seal the first end and the second end of the annular portion, respectively. The eighth seal element is used to keep the indicative material sealed in the annular portion. The center of the annular portion forms a hollow portion filled with an indicative material comprising fluorescent powders or a plurality of granules.

The magnetic arrangement between the annular portion and the seventh, or the eighth, seal element is subject to the type of the embodiment provided, comprising: the annular portion is a plastic material and both the seventh seal element and the eighth seal element are magnetic bodies; the annular portion is a metallic material and both the seventh seal element and the eighth seal element are magnetic bodies; the annular portion is a magnetic body and both the seventh seal element and the eighth seal element are magnetic bodies; or the annular portion is a magnetic body and both the seventh seal element and the eighth seal element are metallic materials.

The structure of the fifth embodiment of the drop indicator is, basically, identical with that of the fourth embodiment of the drop indicator, the difference being that the annular portion and the chamber in the fourth embodiment are monolithically formed whereas the annular portion and the chamber in the fifth embodiment are separately formed.

The sixth embodiment of the drop indicator comprises a hollow chamber containing a partition dividing the chamber into a first chamber and a second chamber respectively filled with an indicative material. This embodiment uses a ninth seal element to seal the first outlet of the first chamber and a tenth seal element to seal the second outlet of the second chamber so as to keep the indicative materials sealed in the first chamber and the second chamber, respectively. A transparent covering material can be used to cover the chamber except for the first outlet and the second outlet, so as to allow direct observation of the indicative material. The indicative material comprises fluorescent powders or a plurality of granules.

The magnetic arrangement between the partition and the ninth, or the tenth, seal element is subject to the type of the embodiment provided, comprising: the partition is a magnetic body and both the ninth seal element and the tenth seal element are metallic materials; the partition is a metallic material and both the ninth seal element and the tenth seal element are magnetic bodies; or the partition is a magnetic body and both the ninth seal element and the tenth seal element are magnetic bodies.

The seventh embodiment of the drop indicator comprises a chamber, a plurality of seal elements, and a housing. The hollow chamber contains a magnetic body in the center thereof. The space between the magnetic body and the chamber is divided into a plurality of third chambers, each of which is filled with an indicative material and comprises a third outlet. The indicative material in each of the third chambers can be different, comprising fluorescent powders or colored granules. This embodiment comprises a plurality of seal elements for closing each of the third outlets, respectively, wherein the magnetic attraction between the magnetic body and the seal element enables each of the seal elements to seal its corresponding third outlet.

The magnetic arrangement between the chamber and the seal element is subject to the type of the embodiment provided, comprising: the chamber is a magnetic body and the seal element is a metallic material; the chamber is a metallic material and the seal element is a magnetic body; the chamber is a magnetic body and the seal element is a magnetic body; the chamber is a metallic material and the seal element is a metallic material; the chamber is a plastic material and the seal element is a metallic material; or the chamber is a plastic material and the seal element is a magnetic body.

The chamber is held within the housing whose exterior surface is provided with an adhesive means. The adhesive means comprises a double-sided adhesive tape or an adhesive substance, so as to allow the drop indicator to be adhered to the product.

This embodiment allows impact detection in multiple directions. Types of the chambers with five, or more than five, chambers can be provided if necessary, for purposes of allowing impact detection in multiple directions.

The structure of the eighth embodiment of the drop indicator is similar to that of the seventh embodiment of the drop indicator, the difference being that the chamber in the eighth embodiment becomes circular in form and allows impact detection in four directions.

The method for dropping indicating according to the present invention includes a drop indicator is attached on a product, the drop indicator includes a chamber, the chamber containing an indicative material adhered to a product; a seal element seal the chamber opening; and the collision impact on the chamber indicated by the release of the indicative material from the chamber when the seal element is moved and released from the opening of the chamber wherein the chamber disposed inside a housing.

The indicative material comprises fluorescent powders or colored granules.

The magnetic arrangement between the chamber and the seal element is subject to the type of the embodiment provided, comprising: the chamber is a magnetic body and the seal element is a metallic material; the chamber is a metallic material and the seal element is a magnetic body; the chamber is a magnetic body and the seal element is a magnetic body; or the chamber is a plastic material and the seal element is a magnetic body.

The present invention allows the inference of whether a faulty product, such as a cell phone or a PDA, has ever been dropped or impacted in delivery or in use by inspecting changes in the indicative material of the drop indicator.

The present invention is used to determine whether a product has ever been dropped when in use by inspecting changes in the original condition of the magnet caused by the interaction between the magnetic force and the acceleration of gravity, inertia force, and colliding force, etc. generated upon collision.

BRIEF DESCRIPTION OF THE DRAWINGS

FIG. 9 shows an aerial view of the drop indicator according to the sixth embodiment of the present invention.

FIG. 10 shows a side view of the drop indicator according to the sixth embodiment of the present invention.

DETAILED DESCRIPTION OF THE PREFERRED EMBODIMENTS

The examples given below serve as the preferred embodiments of the present invention only. The examples should not be construed as a limitation on the actual applicable scope of the invention, and as such, all modifications and alterations without departing from the spirits of the invention and appended claims, including other embodiments, shall remain within the protected scope and claims of the invention.

Figure 1:
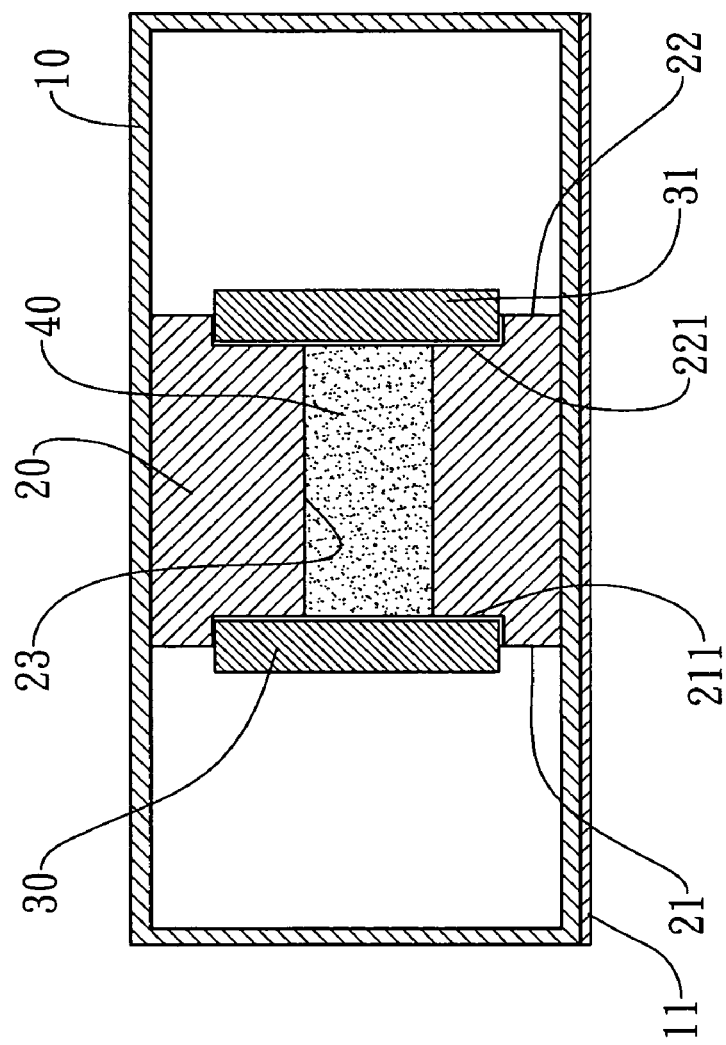
FIG. 1 shows a sectional view of the drop indicator according to the first embodiment of the present invention.
Figure 2:
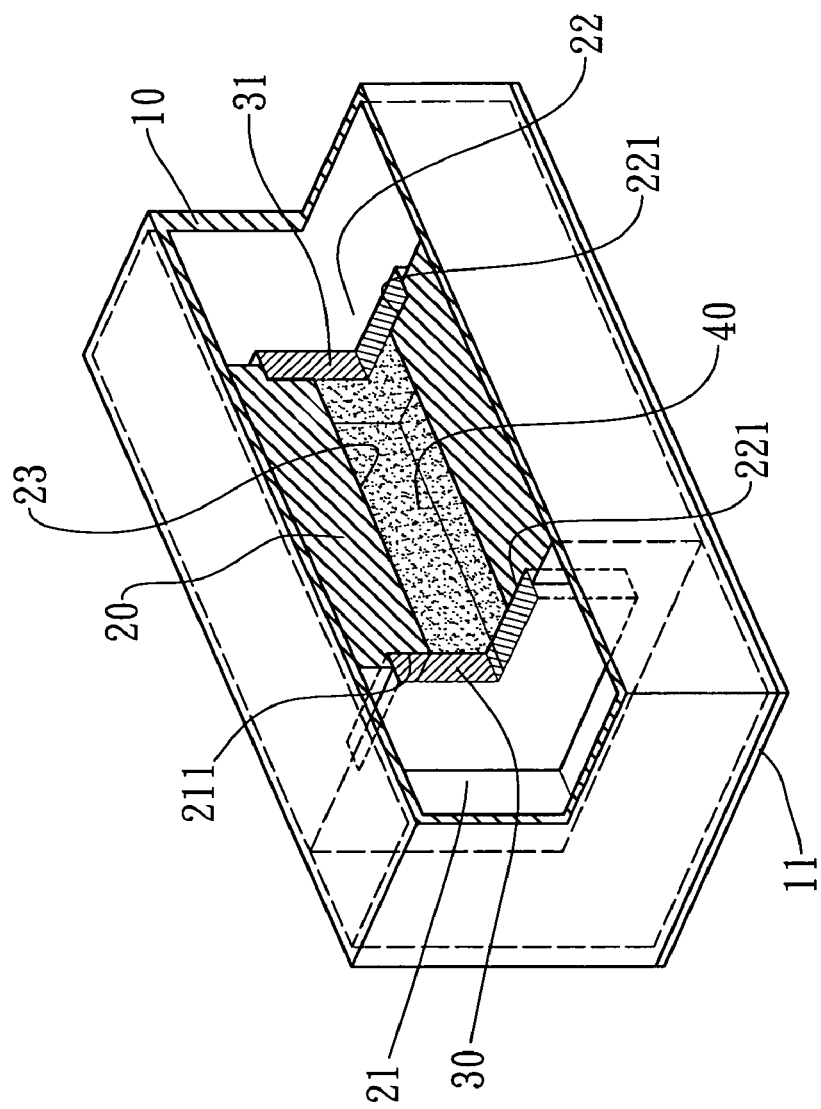
FIG. 2 shows a partial sectional view of the three-dimensional drop indicator according to the first embodiment of the present invention.

FIG. 1 and FIG. 2 show a sectional view of the drop indicator and a partial sectional view of the three-dimensional drop indicator, respectively, according to the first embodiment of the present invention. The first embodiment of the drop indicator comprises a housing 10, a chamber 20, and at least one first seal element 30. The chamber 20 is disposed inside the housing 10, which can be a sealed space, and has at least one first opening 21. The first seal element 30 is used to seal the first opening 21. Therefore, the number of the first opening 21 determines the number of the first seal element 30. The chamber 20 is filled with an indicative material 40, and the first seal element 30 keeps the indicative material 40 sealed in the hollow portion 23 of the chamber 20. When the drop indicator is impacted, the first seal element 30 and the indicative material 40 will be released from the chamber 20 and scattered inside the housing 10, helping determine whether a product has ever been impacted or dropped when in delivery.

The housing 10 is made of a transparent plastic material, which facilitates observation of changes therein, such as the release of the indicative material 40 or the shifting of the first seal element 30, etc. Therefore, this embodiment allows impact detection in two directions.

The indicative material 40 comprises fluorescent powders or a plurality of colored granules, whose brightness facilitates observation. Further, while the fluorescent powders are used as the indicative material 40 and discharged or released from the chamber 20, scattered all over the interior of the housing 10, the powders will no longer go back to their original conditions in that they will be adhered to the housing 10. On the other hand, if other kinds of granules are used as the indicative material 40 and released from the chamber 20, scattered all over the interior of the housing 10, the granules can be recycled in that they will not be adhered to the housing 10.

The invention further comprises a second opening 22 of the chamber 20, with a second seal element 31 placed upon the second opening 22 for closing the second opening 22. Therefore, the first embodiment of the chamber 20 can have two openings, so as to allow impact detection in two directions.

The first opening 21 of the chamber 20 forms a first step portion 211 indented inwardly to allow the first seal element 30 to be mounted on the first step portion 211; the second opening 22 of the chamber 20 forms a second step portion 221 indented inwardly to allow the second seal element 31 to be mounted on the second step portion 221, so that the first seal element 30 and the second seal element 31 can be secured and not prone to shifting.

According to one type of the embodiment, both the first seal element 30 and the second seal element 31 are magnetic bodies. To attain the same magnetic effect as the preceding example does, the arrangements of the constituent materials among the first seal element 30, the second seal element 31, and the chamber 20 can be made as follows: the chamber 20 is a plastic material and both the first seal element 30 and the second seal element 31 are magnetic bodies; the chamber 20 is a metallic material and both the first seal element 30 and the second seal element 31 are magnetic bodies; the chamber 20 is a magnetic body and both the first seal element 30 and the second seal element 31 are metallic materials; or the chamber 20 is a magnetic body and both the first seal element 30 and the second seal element 31 are magnetic bodies. With regard to the seal elements illustrated above, the pairing arrangement of the seal elements disposed opposite each other can also be made in such a way that while one seal element is a magnetic body, the other one is a metallic material. In addition, the magnetic arrangement between the chamber 20 and the first 30, or the second 31, seal element shall be in compliance with the type of the embodiment provided.

For example, when the chamber 20 is a plastic material, both the first seal element 30 and the second seal element 31 are magnetic bodies. That way, when the first seal element 30 and the second seal element 31 are disposed at the opposite ends of the chamber 20, the magnetic line of force between the two magnetic bodies will be in parallel to that between the first seal element 30 and the second element 31. Other embodiments are of similar nature.

To allow the drop indicator to be adhered to the exterior surface of the product, an adhesive means 11 is provided on the exterior surface of the housing 10. The adhesive means 11 comprises equivalent structures of a double-sided adhesive tape or an adhesive substance.

The drop indicator according to the present invention uses a chamber 20 with two side openings 21, 22 and a hollow interior to hold such indicative material 40 as fluorescent powders or colored granules inside the hollow portion 23 of the chamber 20. Two magnets with the same magnetic force serve as the respective seal elements 30, 31 of the two side openings 21, 22. The attraction between the two magnets will keep the fluorescent powders from being released from the hollow portion 23 of the chamber 20 to the outside world. The chamber 20, then, is put inside a plastic housing 10. The drop indicator according to the present invention is installed inside a product. When the product is dropped or impacted, the interaction between the acceleration of gravity, inertia force, and colliding force, etc. generated upon collision and the magnetic force generated by the magnets installed inside the device will cause the magnets at the two side openings 21, 22 to release from the chamber 20 and fall into the housing 10, leading to the discharge of the fluorescent powders from the hollow portion 23 of the chamber 20 to the plastic housing 10. At this moment, given that the fluorescent powders will not go back to their original conditions, whether the product has ever been dropped or impacted can be identified by visually observing the condition of the plastic housing 10, regardless of whether the magnets are returned to their original positions. Liabilities can be determined as a result.

Figure 3:
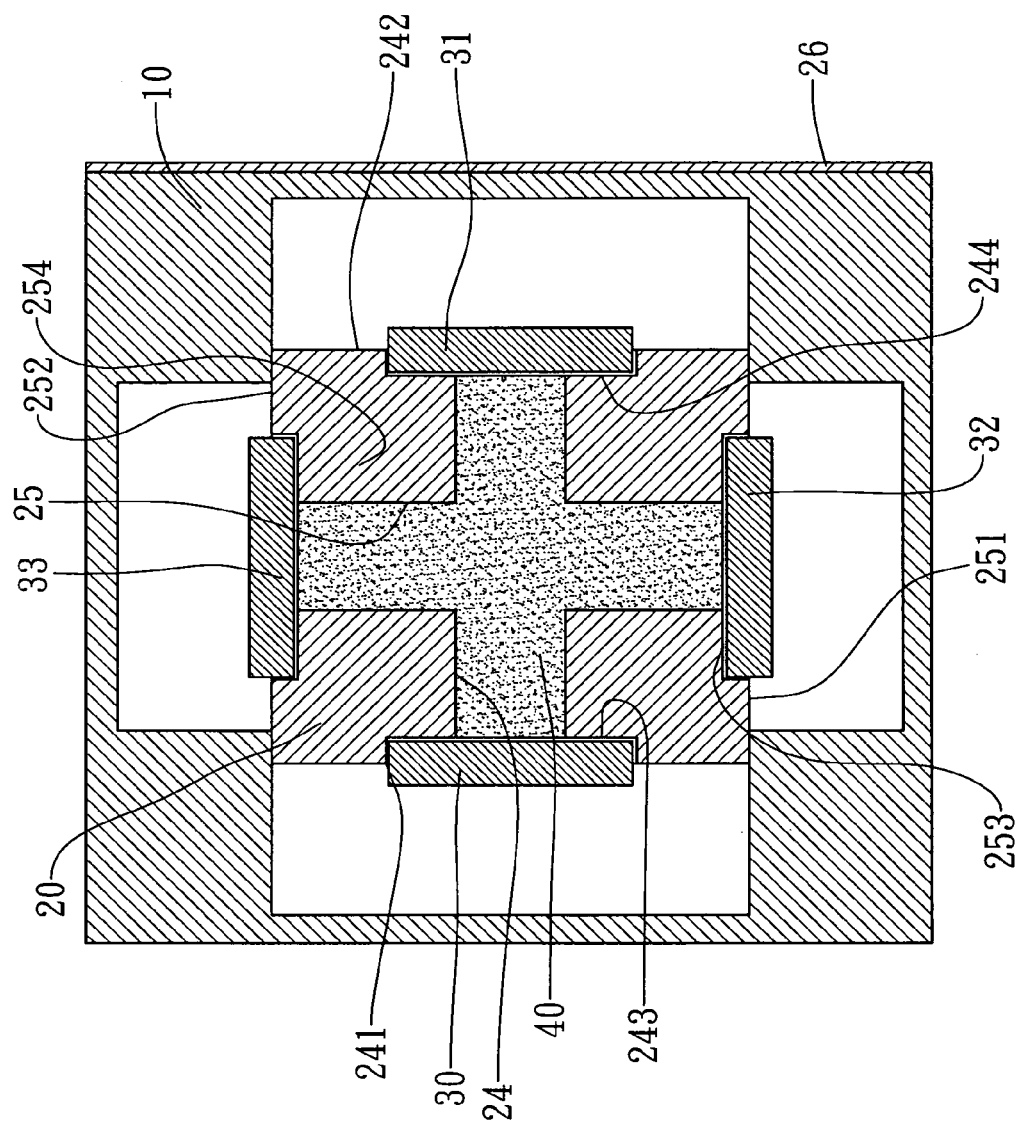
FIG. 3 shows a sectional view of the drop indicator according to the second embodiment of the present invention.

FIG. 3 shows a sectional view of the drop indicator according to the second embodiment of the present invention. In this embodiment, the drop indicator comprises a housing 10 and a chamber 20 contained therein. The housing 10 can be a sealed space. Inside the chamber 20, a first chamber 24 and a second chamber 25 are formed in perpendicular to each other. The first chamber 24 and the second chamber 25 can be in communication with each other, or not, and each of the chambers 20 is filled with an indicative material 40. The first chamber 24 comprises a first opening 241 and a second opening 242. The second chamber 25 comprises a third opening 251 and a fourth opening 252. The first opening 241, the second opening 242, the third opening 251, and the fourth opening 252 are all in communication with the interior of the housing 10. The first opening 241, the second opening 242, the third opening 251, and the fourth opening 252 correspond to a first seal element 30, a second seal element, 31, a third seal element 32, and a fourth seal element 33, respectively. The first seal element 30, the second seal element 31, the third seal element 32, and the fourth seal element 33 are placed upon the first opening 241, the second opening 242, the third opening 251, and the fourth opening 252, respectively, to keep the indicative material 40 en-sealed in the chamber 20. In the event that the drop indicator is impacted or dropped, the seal elements 30, 31, 32, 33 and the indicative material 40 will be released from the chamber 20 and scattered inside the housing 10, helping determine whether a product has ever been impacted or dropped when in delivery or in use. The second embodiment of the present invention allows impact detection in four directions. Therefore, the equivalent structure of the present invention allows impact detection in three, or more than four, directions.

The housing 10 is made of a transparent plastic material, which facilitates observation of changes therein, such as the release of the indicative material 40 or the shifting of the first seal element 30, etc. Therefore, this embodiment allows impact detection in multiple directions.

The indicative material 40 comprises fluorescent powders or a plurality of colored granules, whose brightness facilitates observation.

In the second embodiment of the present invention, the first opening 241, the second opening 242, the third opening 251, and the fourth opening 252 of the chamber 20 respectively form an inwardly indented first step portion 243, second step portion 244, third step portion 253, and fourth step portion 254, so as to allow the first seal element 30, the second seal element 31, the third seal element 32, and the fourth seal element 33 to be mounted on the first step portion 243, the second step portion 244, the third step portion 253, and the fourth step portion 254, respectively. That way, the first seal element 30, the second seal element 31, the third seal element 32, and the fourth seal element 33 can be secured and not prone to shifting.

According to one type of the embodiment, the first seal element 30, the second seal element 31, the third seal element 32, and the fourth seal element 33 can be magnetic bodies or metallic materials. To attain the same magnetic effect as the preceding example does, the arrangements of the constituent materials among the first seal element 30, the second seal element 31, the third seal element 32, the fourth seal element 33, and the chamber 20 can be made as follows: the chamber 20 is a plastic material, whereas the first seal element 30, the second seal element 31, the third seal element 32, and the fourth seal element 33 are magnetic bodies; the chamber 20 is a metallic material, whereas the first seal element 30, the second seal element 31, the third seal element 32, and the fourth seal element 33 are magnetic bodies; the chamber 20 is a magnetic body, whereas the first seal element 30, the second seal element 31, the third seal element 32, and the fourth seal element 33 are metallic materials; the chamber 20 is a non-magnetic body, whereas the first seal element 30, the second seal element 31, the third seal element 32, and the fourth seal element 33 are magnetic bodies; or the chamber 20 is a magnetic body, whereas the first seal element 30, the second seal element 31, the third seal element 32, and the fourth seal element 33 are magnetic bodies. With regard to the seal elements illustrated above, the pairing arrangement of the seal elements disposed opposite each other can also be made in such a way that while one seal element is a magnetic body, the other one is a metallic material. In addition, the magnetic arrangement between the chamber 20 and the first 30, the second 31, the third 32, or the fourth 33 seal element shall be in compliance with the type of the embodiment provided.

To allow the drop indicator to be adhered to the exterior surface of the product, an adhesive means 26 is provided on the exterior surface of the housing 10. The adhesive means 26 comprises equivalent structures of a double-sided adhesive tape or an adhesive substance.

Figure 4:
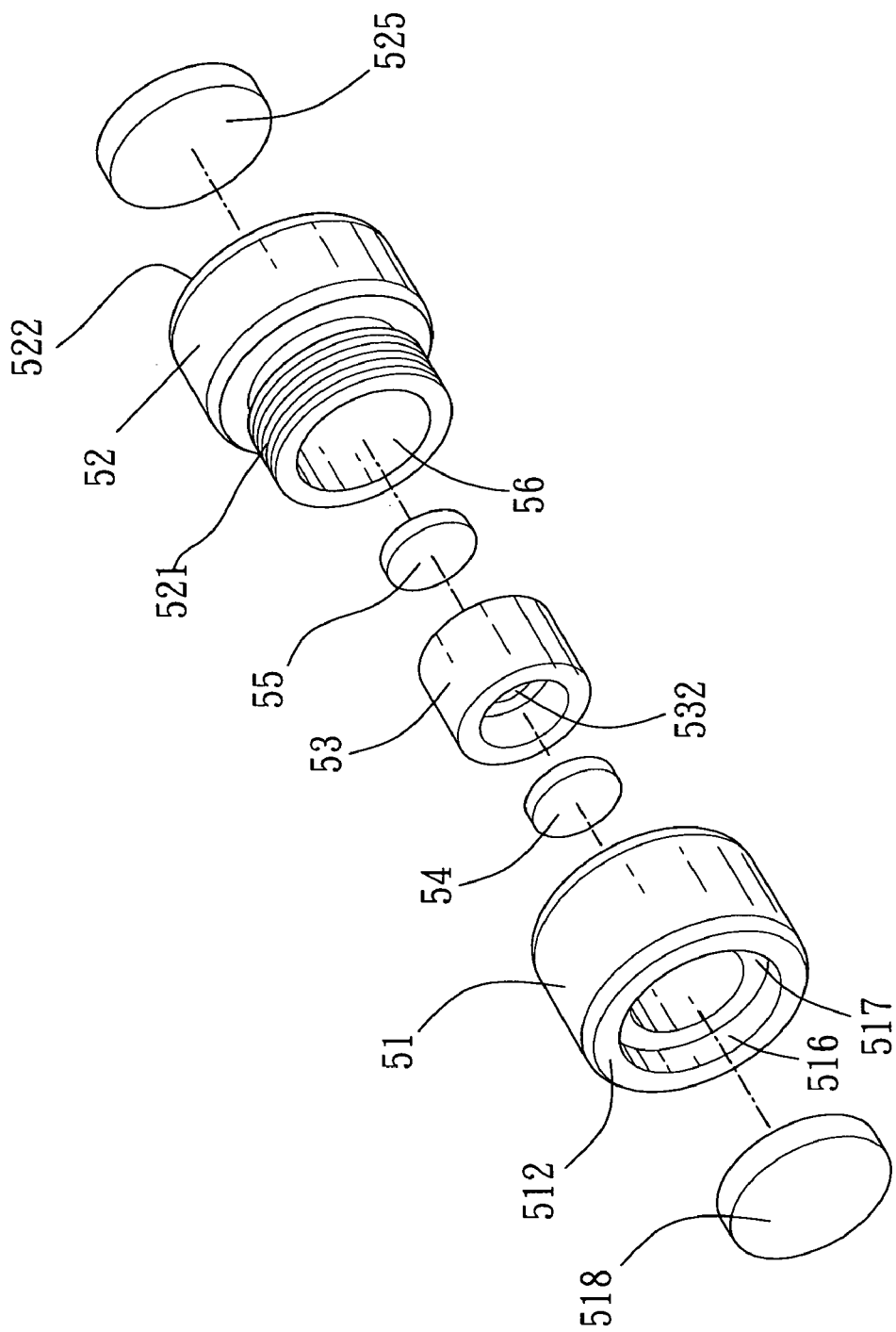
FIG. 4 shows an exploded view of the drop indicator according to the third embodiment of the present invention.
Figure 5:
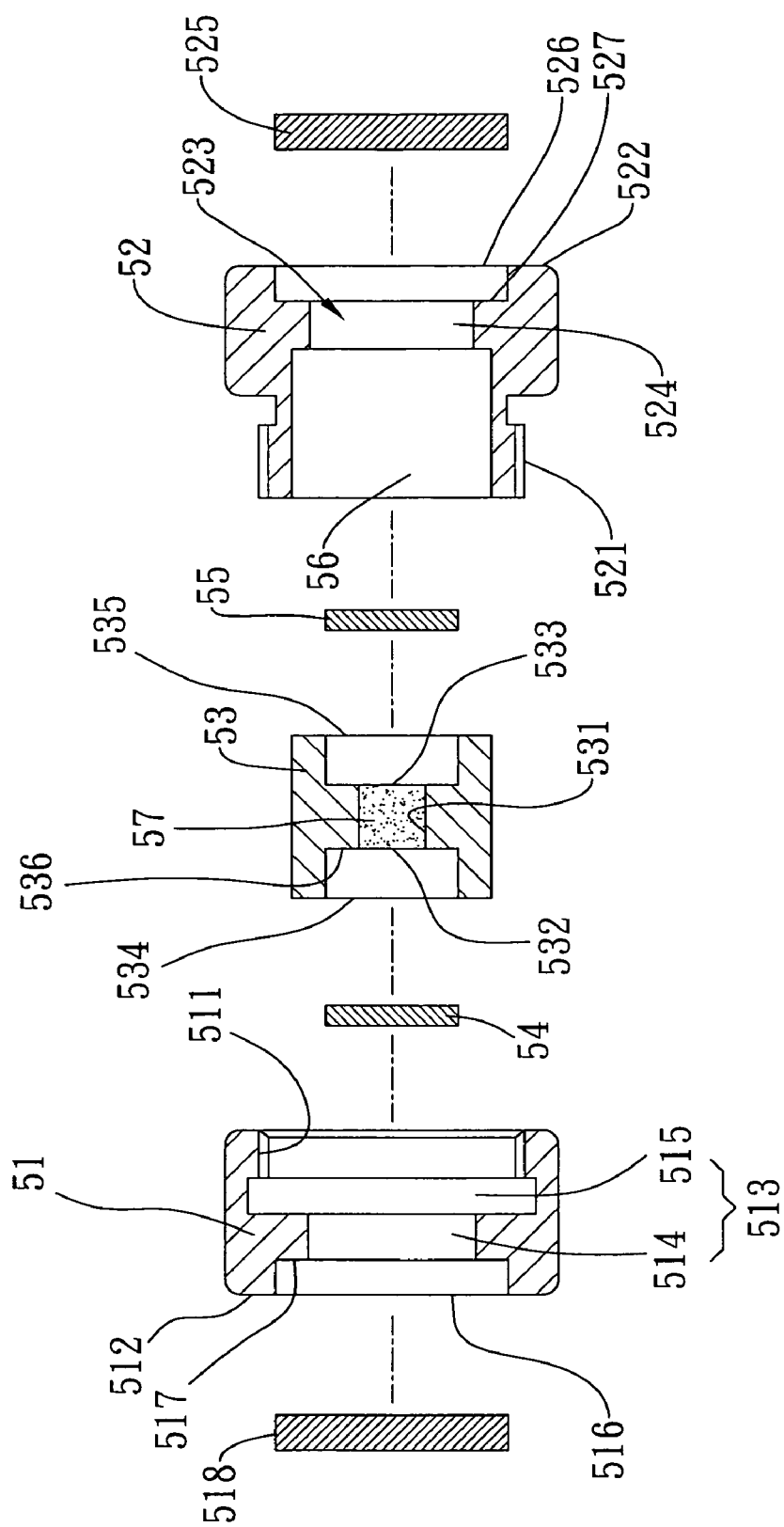
FIG. 5 shows an exploded view of the sectioned drop indicator according to the third embodiment of the present invention.
Figure 6:
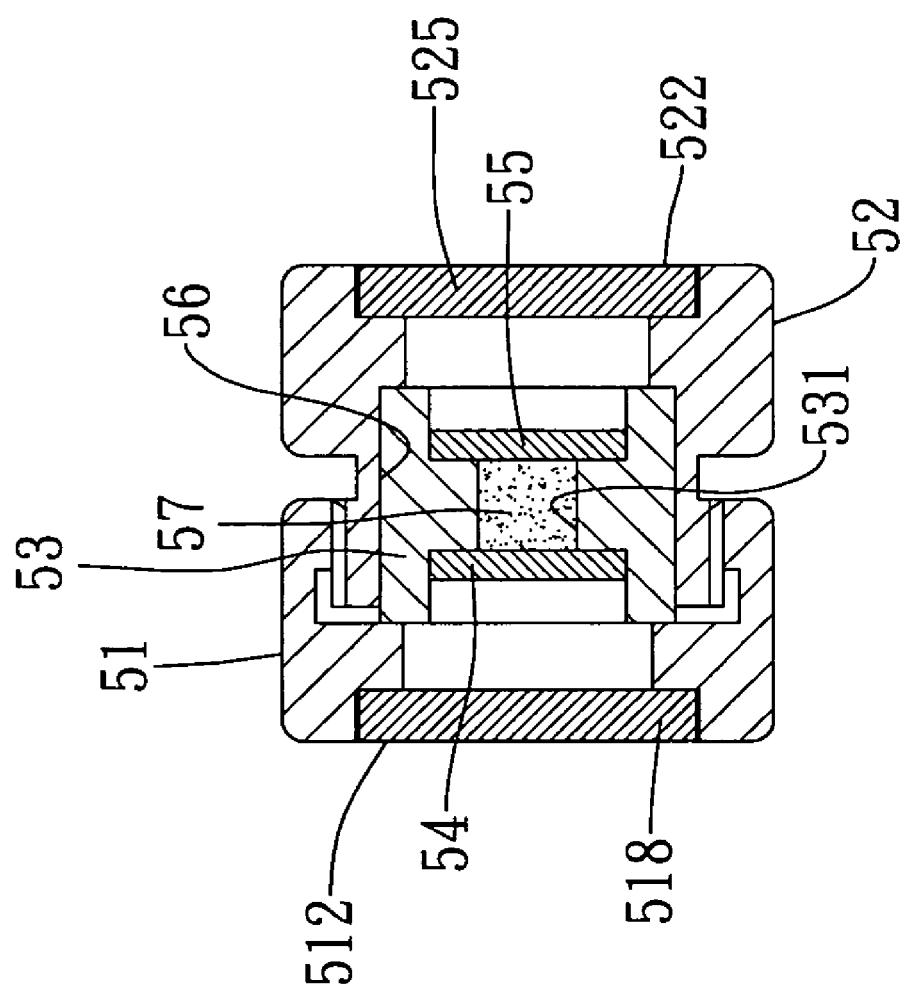
FIG. 6 shows a sectional view of the assembled drop indicator according to the third embodiment of the present invention.

FIG. 4, FIG. 5, and FIG. 6 show an exploded view of the drop indicator, an exploded view of the sectioned drop indicator, and a sectional view of the assembled drop indicator, respectively, according to the third embodiment of the present invention. In this embodiment, the drop indicator is circular in form, comprising a first element 51, a second element 52, a third element 53, a fifth seal element 54, and a sixth seal element 55, with the first element 51 and the second element 52 screwing each other forming a third space 56 containing the third element 53. The first element 51 comprises a hollow first joint portion 511 and a first outer end 512, the first joint portion 511 being next to a first space 513. The second element 52 comprises a hollow second joint portion 521 and a second outer end 522, the second joint portion 521 being next to a second space 523, allowing the first element 51 to join the second element 52 to form the third space 56 containing the third element 53. Since the first joint portion 511 is a female threaded portion and the second joint portion 521 is a male threaded portion, both are able to screwing each other.

The third element 53 comprises a hollow portion 531 filled with an indicative material 57 whose discharge or release from the third element 53 helps determine whether a product has ever been impacted or dropped. The indicative material 57 comprises fluorescent powders or a plurality of granules that may be colored The fifth seal element 54 is used to seal the first end 532 of the hollow portion 531 of the third element 53. The sixth seal element 55 is used to seal the second end 533 of the hollow portion 531 of the third element 53. Therefore, the indicative material 57 is en-sealed in the hollow portion 531 of the third element 53. When the drop indicator is impacted or dropped, causing the fifth or the sixth seal element 54, 55 to be released from the hollow portion 531 of the third element 53, the indicative material 57 will be discharged into the third space 56, allowing the observer to examine whether the product has ever been impacted or dropped.

The first outer end 512 of the first element 51 is provided with a first transparent element 518 made of an acrylic material. The second outer end 522 of the second element 52 is provided with a second transparent element 525 made of an acrylic material. With the drop indicator adhered to the product throughout delivery, the observer is able to work out whether the product has ever been impacted or dropped during delivery by looking through the transparent elements 518, 525 to examine whether the indicative material 57 has ever been discharged or the seal elements 54, 55 been shifted.

According to one type of the embodiment, both the fifth seal element 54 and the sixth seal element 55 are magnetic bodies or metallic materials. To attain the same magnetic effect as the preceding example does, the arrangements of the constituent materials among the fifth seal element 54, the sixth seal element 55, and the chamber can be made as follows: the third element 53 is a plastic body and both the fifth seal element 54 and the sixth seal element 55 are magnetic bodies; the third element 53 is a metallic material and both the fifth seal element 54 and the sixth seal element 55 are magnetic bodies; the third element 53 is a magnetic body and both the fifth seal element 54 and the sixth seal element 55 are metallic materials; or the third element 53 is a magnetic body and both the fifth seal element 54 and the sixth seal element 55 are magnetic bodies. With regard to the seal elements illustrated above, the pairing arrangement of the seal elements disposed opposite each other can also be made in such a way that while one seal element is a magnetic body, the other one is a metallic material. In addition, the magnetic arrangement between the third element 53 and the fifth 54, or the sixth 55, seal element shall be in compliance with the type of the embodiment provided.

An adhesive means is provided on the exterior surface of the first element 51 or the second element 52. The adhesive means comprises a double-sided adhesive tape or an adhesive substance, allowing the drop indicator to be adhered to the product.

The first element 51 or the second element 52 is made of a transparent plastic material, which facilitates observation of changes within the drop indicator.

Furthermore, according to the present invention, the hollow portion 531 of the third element 53 comprises a fifth opening 534 and a sixth opening 535 respectively forming an inwardly indented fifth step portion 536 and sixth step portion 537, so as to allow the fifth seal element 54 and the sixth seal element 55 to be mounted on the fifth step portion 536 and the sixth step portion 537, respectively. Such a design gives warning in two directions, concerning object shifting, by having the fifth and the sixth seal elements 54, 55 mounted on the fifth step portion 536 and the sixth step portion 537, respectively.

The first space 513 of the first element 51 comprises a first hollow portion 514 next to a third hollow portion 515, whereas the second space 523 of the second element 52 comprises a second hollow portion 524. Such a design provides space for the fifth and the sixth seal elements 54, 55 to shift around when the third element 53 is mounted on the third space 56. The design also facilitates observation of changes of the indicative material 57.

The first outer end 512 of the first element 51 comprises a seventh opening 516 forming a seventh step portion 517 indented inwardly, allowing the first transparent element 518 to be mounted on the seventh step portion 517. The second outer end 522 of the second element 52 comprises an eighth opening 526 forming an eighth step portion 527 indented inwardly, allowing the second transparent element 525 to be mounted on the eighth step portion 527. Therefore, through the installation of the first transparent element 518 and the second transparent element 525, which serve as windows, this embodiment provides the observer easy access to examine the conditions inside the drop indicator.

This embodiment uses the first element 51 to screwing the second element 52 to form the third space 56 in the hollow portion in between, so as to hold the third element 53 within the third space 56. The fifth seal element 54 and the sixth seal element 55 are also used to keep the indicative material 57 en-sealed in the hollow portion 531 of the third element 53. When the product is impacted or dropped, the fifth seal element 54 or the sixth seal element 55 inside the drop indicator will be released from the third element 53, causing the discharge of the indicative material 57, and therefore providing clues with regard to whether the product has ever been impacted or dropped.

Figure 7:
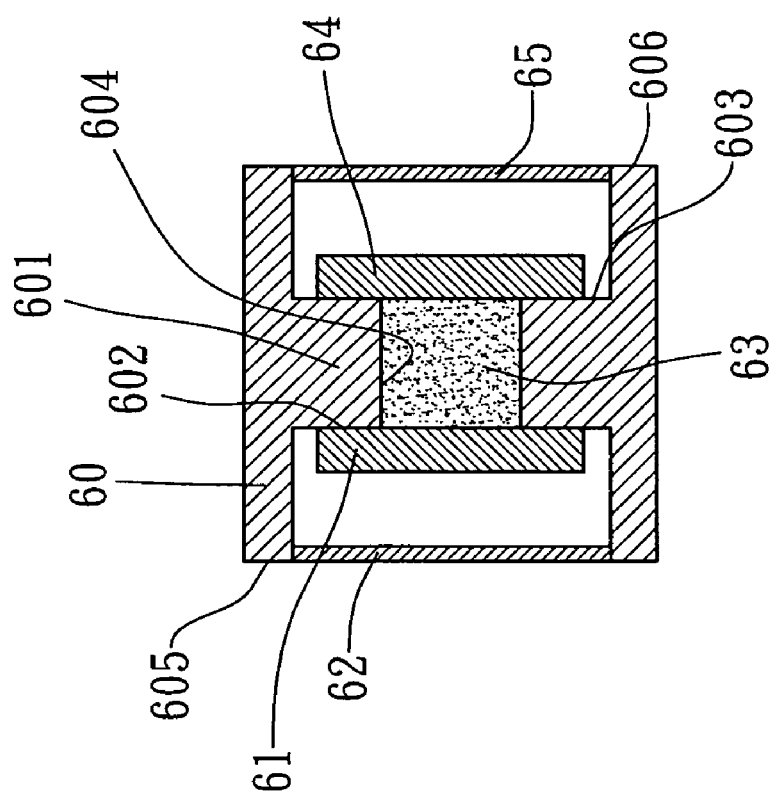
FIG. 7 shows a sectional view of the drop indicator according to the fourth embodiment of the present invention.

FIG. 7 shows a sectional view of the drop indicator according to the fourth embodiment of the present invention. The fourth embodiment of the drop indicator comprises a chamber 60, a seventh seal element 61, and a third transparent element 62. The chamber 60 is hollow whose interior wall is provided with an annular portion 601. The annular portion 601 in one type of the embodiment comprises a first end 602 sealed by the seventh seal element 61. The annular portion 601 in another type of the embodiment comprises a first end 602 and a second end 603, allowing the seventh seal element 61 and the eighth seal element 62 to seal the first end 602 and the second end 603 of the annular portion 601, respectively. The center of the annular portion 601 forms a hollow portion 604 filled with an indicative material 63 comprising fluorescent powders or a plurality of granules. The indicative material 63 is used to show that an impact has occurred through changes thereof.

The third transparent element 62 seals the first end 605 of the chamber 60 and forms a sealed space, allowing the observer to inspect whether the indicative material 63 inside the chamber 60 has ever been discharged so as to determine whether the product has ever been impacted or dropped. The third transparent element 62 is an acrylic material.

The present invention comprises an eighth seal element 64 closing the second end 603 of the annular portion 601 and a fourth transparent element 65 sealing the second end 606 of the chamber 60 and thus forming a sealed space. As described above, the eighth seal element 64 is used to keep the indicative material 63 en-sealed in the annular portion 601, whereas the fourth transparent element 65 is used to provide the observer another window to inspect changes within the chamber 60. The fourth transparent element 65 is an acrylic material.

According to one type of the embodiment, both the seventh seal element 61 and the eighth seal element 64 are magnetic bodies or metallic materials. To attain the same magnetic effect as the preceding example does, the arrangements of the constituent materials among the seventh seal element 61, the eighth seal element 64, and the chamber 60 can be made as follows: the annular portion 601 is a plastic material and both the seventh seal element 61 and the eighth seal element 64 are magnetic bodies; the annular portion 601 is a metallic material and both the seventh seal element 61 and the eighth seal element 64 are magnetic bodies; the annular portion 601 is a magnetic body and both the seventh seal element 61 and the eighth seal element 64 are magnetic bodies; the annular portion 601 is a magnetic body and both the seventh seal element 61 and the eighth seal element 64 are metallic materials; or the annular portion 601 is a non-magnetic body with the seventh seal element 61 being a magnetic body and the eighth seal element 64 being a metallic material. With regard to the seal elements illustrated above, the pairing arrangement of the seal elements disposed opposite each other can also be made in such a way that while one seal element is a magnetic body, the other one is a metallic material. In addition, the magnetic arrangement between the annular portion 601 and the seventh 61, or the eighth 64, seal element shall be in compliance with the type of the embodiment provided.

An adhesive means is provided on the exterior surface of the chamber 60. The adhesive means comprises a double-sided adhesive tape or an adhesive substance, allowing the drop indicator to be adhered to the product.

Figure 8:
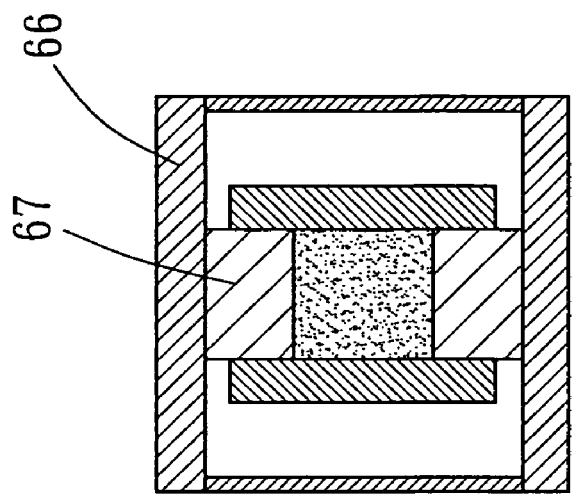
FIG. 8 shows a sectional view of the drop indicator according to the fifth embodiment of the present invention.

FIG. 8 shows a sectional view of the drop indicator according to the fifth embodiment of the present invention. The structure of the fifth embodiment of the drop indicator is, basically, identical with that of the fourth embodiment of the drop indicator, the difference being that the annular portion 601 and the chamber 60 in the fourth embodiment are monolithically formed whereas the annular portion 67 and the chamber 66 in the fifth embodiment are separately formed.

FIG. 9 and FIG. 10 respectively show an aerial view and a side view of the drop indicator according to the sixth embodiment of the present invention. The sixth embodiment of the drop indicator comprises a chamber 70, a ninth seal element 71, a tenth seal element 72, and a housing 73. The chamber 70 is hollow and contains a partition 74 dividing the chamber 70 into a first chamber 701 and a second chamber 702 respectively filled with an indicative material 75, wherein the first chamber 701 comprises a first outlet 703 and the second chamber 702 comprises a second outlet 704. Both the first outlet 703 and the second outlet 704 provide access for the indicative material 75. The ninth seal element 71 is used to seal the first outlet 703 and the tenth seal element 72 is used to seal the second outlet 704 so as to keep the indicative materials 75 en-sealed in the first chamber 701 and the second chamber 702, respectively. As FIG. 9 shows, a transparent covering material 76 can be used to cover the chamber 70 except for the first outlet 703 and the second outlet 704, so as to allow direct observation of the indicative material 75.

The indicative material 75 comprises fluorescent powders or a plurality of colored granules.

The chamber 70 is disposed inside a housing 73 made of a transparent material, facilitating observation of changes within the chamber 70.

According to one type of the embodiment, both the ninth seal element 71 and the tenth seal element 72 are magnetic bodies or metallic materials. To attain the same magnetic effect as the preceding example does, the arrangements of the constituent materials among the ninth seal element 71, the tenth seal element 72, and the partition 74 can be made as follows: the partition 74 is a magnetic body and both the ninth seal element 71 and the tenth seal element 72 are metallic materials; the partition 74 is a metallic material and both the ninth seal element 71 and the tenth seal element 72 are magnetic bodies; or the partition 74 is a magnetic body and both the ninth seal element 71 and the tenth seal element 72 are magnetic bodies. With regard to the seal elements illustrated above, the pairing arrangement of the seal elements disposed opposite each other can also be made in such a Way that while one seal element is a magnetic body, the other one is a metallic material. In addition, the magnetic arrangement between the partition 74 and the ninth 71, or the tenth 72, seal element shall be in compliance with the type of the embodiment provided.

An adhesive means 77 is provided on the exterior surface of the housing 73. The adhesive means 77 comprises a double-sided adhesive tape or an adhesive substance, allowing the drop indicator to be adhered to the product.

Figure 11:
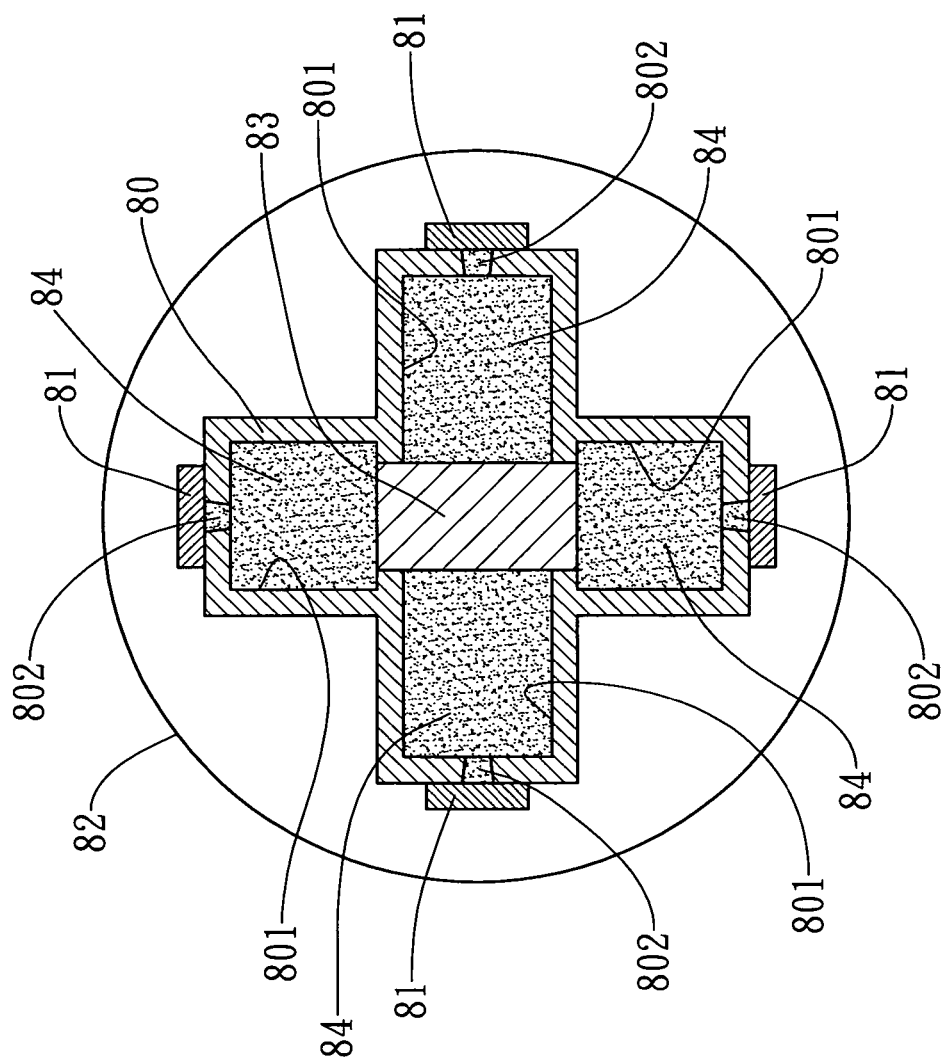
FIG. 11 shows an aerial view of the drop indicator according to the seventh embodiment of the present invention.

FIG. 11 shows an aerial view of the drop indicator according to the seventh embodiment of the present invention. The seventh embodiment of the drop indicator comprises a chamber 80, a plurality of seal elements 81, and a housing 82. The chamber 80 is hollow and contains a magnetic body 83 in the center thereof. The space between the magnetic body 83 and the chamber 80 is divided into a plurality of third chambers 801, each of which is filled with an indicative material 84 and comprises a third outlet 802. The plurality of seal elements 81 are used to seal each of the third outlets 802, respectively, wherein the magnetic attraction between the magnetic body 83 and the seal element 81 enables each of the seal elements 81 to seal its corresponding third outlet 802. The indicative material 84 comprises fluorescent powders or a plurality of colored granules.

According to one type of the embodiment, the seal element 81 is a magnetic body or a metallic material. To attain the same magnetic effect as the preceding example does, the arrangements of the constituent materials between the seal element 81 and the chamber 80 can be made as follows: the chamber 80 is a magnetic body and the seal element 81 is a metallic material; the chamber 80 is a metallic material and the seal element 81 is a magnetic body; the chamber 80 is a magnetic body and the seal element 81 is a magnetic body; the chamber 80 is a plastic material or a non-magnetic body and the seal element 81 is a metallic material or a magnetic body; or the chamber 80 is a plastic material or a non-magnetic body and the seal element corresponding to the seal element 81 is a magnetic body With regard to the seal elements illustrated above, the pairing arrangement of the seal elements disposed opposite each other can also be made in such a way that while one seal element is a magnetic body, the other one is a metallic material. In addition, the magnetic arrangement between the chamber 80 and the seal element 81 shall be in compliance with the type of the embodiment provided.

The chamber 80 is held within the housing 82 whose exterior surface is provided with an adhesive means. The adhesive means comprises a double-sided adhesive tape or an adhesive substance, allowing the drop indicator to be adhered to the product.

This embodiment allows impact detection in multiple directions. Types of the chambers with five, or more than five, chambers can be provided if necessary, for purposes of allowing impact detection in multiple directions.

Figure 12:
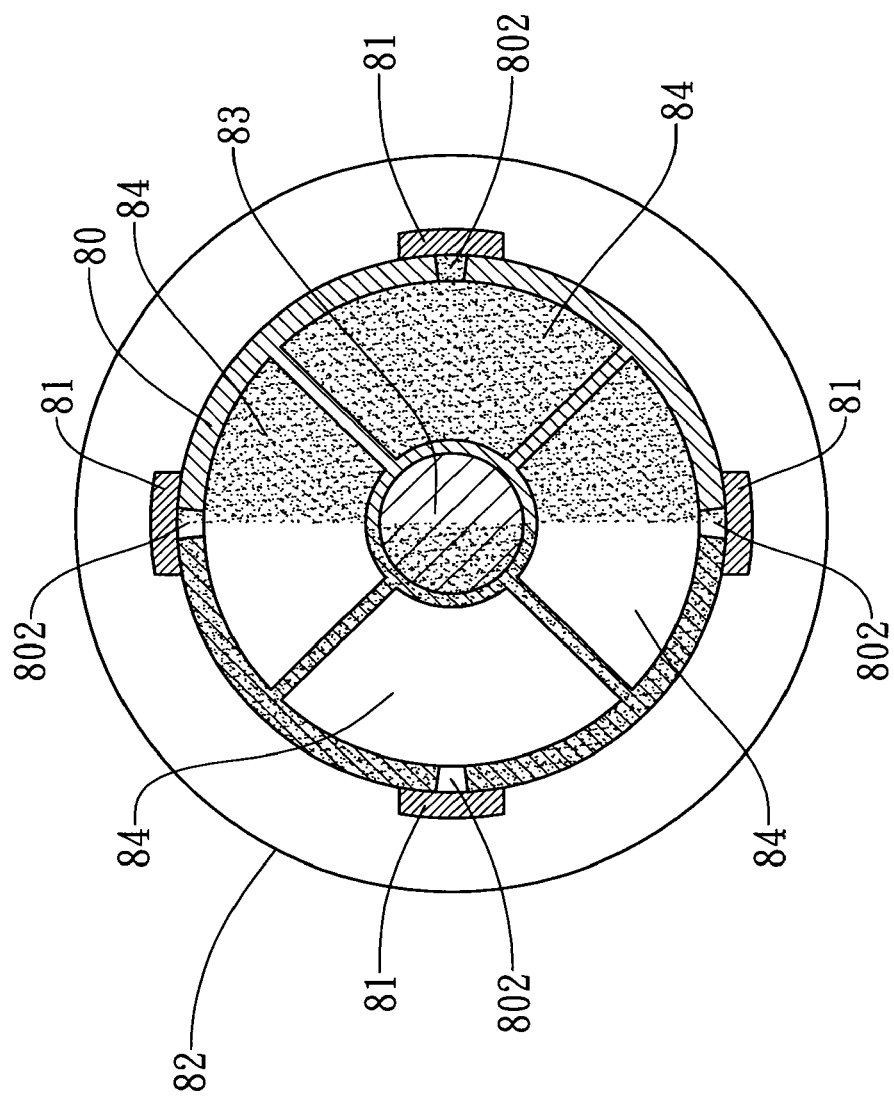
FIG. 12 shows an aerial view of the drop indicator according to the eighth embodiment of the present invention.

FIG. 12 shows an aerial view of the drop indicator according to the eighth embodiment of the present invention. The structure of the eighth embodiment of the drop indicator is similar to that of the seventh embodiment of the drop indicator, the difference being that the chamber 80 in the eighth embodiment is rectangular in form and allows impact detection in four directions.

The method for dropping indicating according to the present invention includes a drop indicator is attached on a product, the drop indicator comprises a chamber containing an indicative material adhered to a product; a seal element seal the chamber opening; and the collision impact on the chamber indicated by the release of the indicative material from the chamber when the seal element is shifted and released from the opening of the chamber. Where in the chamber disposed inside a housing.

The indicative material comprises fluorescent powders or colored granules.

According to one type of the embodiment, the seal element is a magnetic body or a metallic material. To attain the same magnetic effect as the preceding example does, the arrangements of the constituent materials between the seal element and the chamber can be made as follows: the chamber is a magnetic body and the seal element is a metallic material; the chamber is a metallic material and the seal element is a magnetic body; the chamber is a magnetic body and the seal element is a magnetic body; or the chamber is a plastic material and the seal element is a magnetic body. With regard to the seal elements illustrated above, the pairing arrangement of the seal elements disposed opposite each other can also be made in such a way that while one seal element is a magnetic body, the other one is a metallic material. In addition, the magnetic arrangement between the chamber and the seal element shall be in compliance with the type of the embodiment provided Namely, according to the present invention, drop indicators are installed in newly released products, such as cell phones or PDAs. If the cell phone or PDA has ever been dropped in delivery, upon sale, or in use, the release of the indicative material or the seal element in the drop indicator will help determine whether the faulty product has ever been dropped or impacted when the product is returned for repair.

In conclusion, the present invention provides a chamber filled with indicative materials such as fluorescent powders. A seal element is used to seal the chamber opening through magnetic force. When impact occurs, the seal element will be released from the opening, leading to the discharge of the fluorescent powders from the chamber and the dispersion of such powders in the housing. Therefore, the observer is able to decide whether the product has ever been impacted or dropped. In view of the foregoing, the present invention meets the requirements for patentability, and a patent application is filed pursuant to the law.

With detailed description of the preferred embodiments of the present invention, those skilled in the art will readily appreciate that various modifications and changes can be applied to the embodiments of the invention as hereinbefore described without departing from its scope, defined in and by the appended claims. In addition, the embodiments should not be construed as a limitation on the implementation of applicable description of the invention.

What is claimed is:

1. A drop indicator comprising:
   a first element having a hollow first joint portion and a first outer end, the first joint portion being next to a first space;
   a second element having a hollow second joint portion and a second outer end, the second joint portion being next to a second space, allowing the first element to join the second element to form a third space;
   a third element disposed inside the third space, the third element having a hollow portion filled with an indicative material;
   a first seal element closing a first end of the hollow portion of the third element; and
   a second seal element closing a second end of the hollow portion of the third element.

2. The drop indicator as claimed in claim 1, wherein the first outer end of the first element is provided with a first transparent element.

3. The drop indicator as claimed in claim 2, wherein the first transparent element is an acrylic material.

4. The drop indicator as claimed in claim 2, wherein the second transparent element is an acrylic material.

5. The drop indicator as claimed in claim 2, wherein the first outer end of the first element comprises a first opening forming a first step portion indented inwardly, so as to allow the first transparent element to be mounted on the first step portion.

6. The drop indicator as claimed in claim 1, wherein the second outer end of the second element is provided with a second transparent element.

7. The drop indicator as claimed in claim 6, wherein the second outer end of the second element comprises a first opening forming a first step portion indented inwardly, so as to allow the second transparent element to be mounted on the first step portion.

8. The drop indicator as claimed in claim 1, wherein the third element is a plastic body and both the first seal element and the second seal element are magnetic bodies.

9. The drop indicator as claimed in claim 1, wherein the third element is a plastic body and either the first seal element or the second seal element is a magnetic body.

10. The drop indicator as claimed in claim 1, wherein the third element is a metallic material and both the first seal element and the second seal element are magnetic bodies.

11. The drop indicator as claimed in claim 1, wherein the third element is a metallic material and either the first seal element or the second seal element is a magnetic body.

12. The drop indicator as claimed in claim 1, wherein the third element is a magnetic body and both the first seal element and the second seal element are metallic materials.

13. The drop indicator as claimed in claim 1, wherein the third element is a magnetic body and either the first seal element or the second seal element is a metallic material.

14. The drop indicator as claimed in claim 1, wherein the third element is a magnetic body and both the first seal element and the second seal element are magnetic bodies.

15. The drop indicator as claimed in claim 1, wherein an adhesive means is provided on the exterior surface of either the first element or the second element.

16. The drop indicator as claimed in claim 15, wherein the adhesive means comprises a double-sided adhesive tape or an adhesive substance.

17. The drop indicator as claimed in claim 1, wherein the first element or the second element is made of a transparent plastic material.

18. The drop indicator as claimed in claim 1, wherein the indicative material is a fluorescent powder.

19. The drop indicator as claimed in claim 1, wherein the indicative material comprises a plurality of granules.

20. The drop indicator as claimed in claim 1, wherein the hollow portion of the third element comprises a first opening and a second opening respectively forming an inwardly indented first step portion and second step portion, so as to allow the first seal element and the second seal element to be mounted on the first step portion and the second step portion, respectively.

21. The drop indicator as claimed in claim 1, wherein the first joint portion is a female threaded portion and the second joint portion is a male threaded portion.

22. The drop indicator as claimed in claim 1, wherein the first space of the first element comprises a first hollow portion next to a third hollow portion while the second space of the second element comprises a second hollow portion.

* * * * *

UNITED STATES PATENT AND TRADEMARK OFFICE
CERTIFICATE OF CORRECTION

PATENT NO. : 7,918,179 B2
APPLICATION NO. : 12/153299
DATED : April 5, 2011
INVENTOR(S) : Sheau-Shi Pan et al.

It is certified that error appears in the above-identified patent and that said Letters Patent is hereby corrected as shown below:

Title Page:

Correct line (73) Assignee to read as follows:

Industrial Technology Research Institute, Hsinchu (TW) and AFA Paper Product Co., Ltd., Taipei County (TW)

Signed and Sealed this
Thirty-first Day of July, 2012

David J. Kappos
*Director of the United States Patent and Trademark Office*